UNITED STATES PATENT OFFICE.

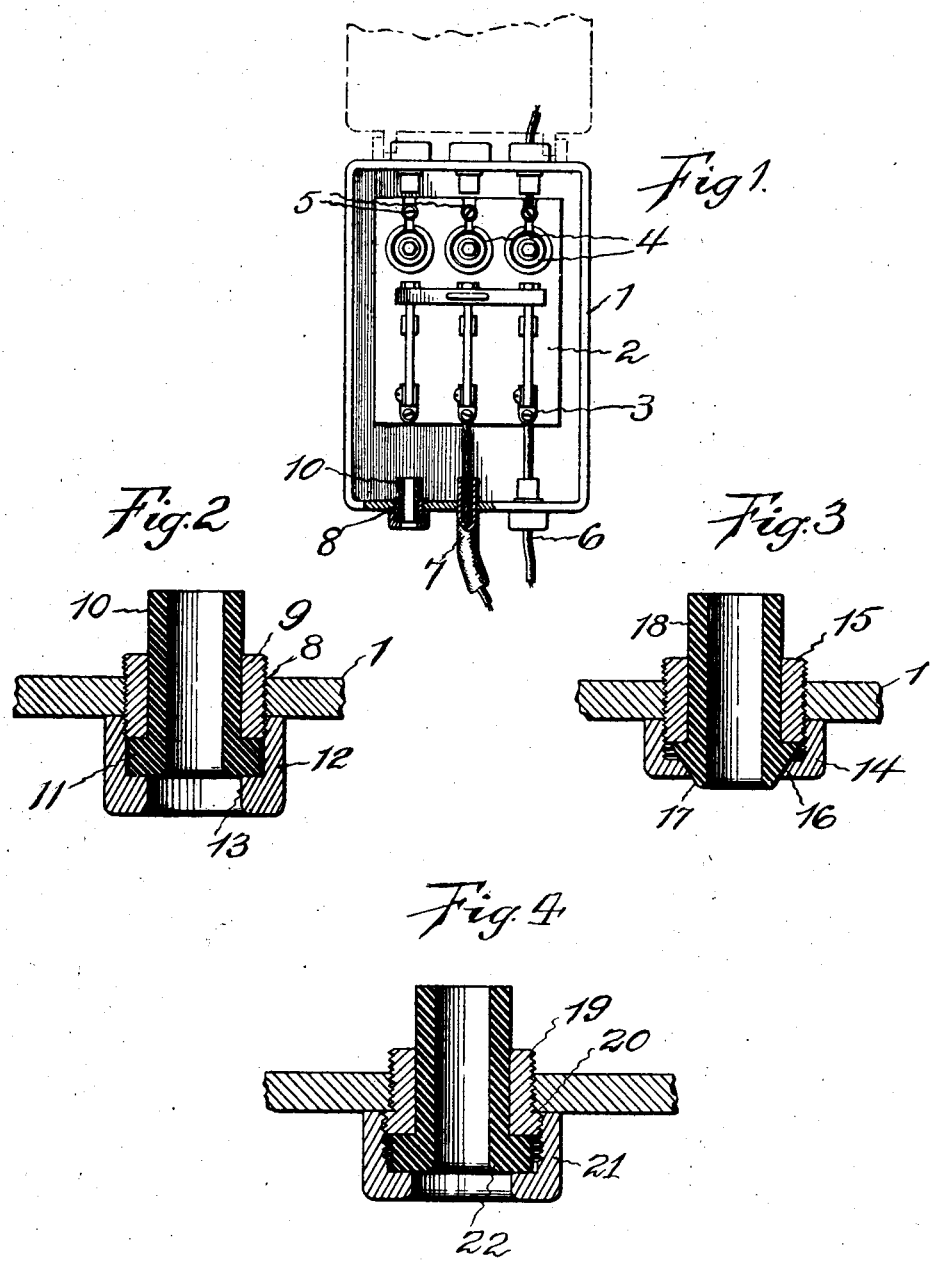

HENRY TRUMBULL, OF PLAINVILLE, CONNECTICUT, ASSIGNOR TO TRUMBULL ELECTRIC MANUFACTURING COMPANY, OF PLAINVILLE, CONNECTICUT, A CORPORATION OF CONNECTICUT.

INSULATOR.

No. 887,877.  Specification of Letters Patent.  Patented May 19, 1908.

Application filed March 2, 1907. Serial No. 360,146.

*To all whom it may concern:*

Be it known that I, HENRY TRUMBULL, a citizen of the United States, and a resident of Plainville, in the county of Hartford and State of Connecticut, (whose post-office address is Plainville, Connecticut,) have invented certain new and useful Improvements in Insulators, of which the following is a full, clear, and exact description, whereby any one skilled in the art may make and use the same.

The invention relates to insulating devices and more particularly to an insulator or bushing for use in connection with walls, to secure protection for wires passing therethrough.

The object of the invention is to provide a simple device which may be applied to or removed from the wall opening and securely locked therein.

A still further object is to provide a removable insulating nipple for use in connection with junction or conduit boxes.

Referring to the drawings:—Figure 1 is a view illustrating one mode of applying the insulating nipples, and shows a panel switch box in elevation. Fig. 2 is a detailed view in vertical section on enlarged scale, showing the insulating nipple and appurtenant parts. Fig. 3 is a similar view of a slightly modified form of insulating bushing. Fig. 4 illustrates a nipple similar to that shown in Figs. 1 and 2, with a slightly modified form of locking device.

It has been common practice to insulate wires or cables passing through metallic junction boxes, with a bushing of insulating material which ordinarily has been passed through an opening in the box and "taped" or otherwise uncertainly fastened about the wire or cable. Of course this usage has occurred where "open wiring" has been used; that is, in contradistinction to "closed wiring" where an insulated conduit is used about the wire.

It is one of the objects of the present invention to provide an insulating bushing which may be used in a wall opening where "open wiring" is employed or may be readily removed to permit conduit or "closed wiring."

In the accompanying drawing numeral 1 denotes a metallic box known as a panel box within which is arranged an insulating base 2 provided with switch terminals 3, fuse plugs 4 and fuse terminals 5. In introducing wires to the terminals 3 and 5, two methods may be employed, the open wiring method illustrated at 6, or the closed wiring shown at 7. In the open wiring system it is desirable and necessary to thoroughly insulate the wiring from the wall of the metallic box 1, while in the closed wiring illustrated at 7, the conduit itself, furnishes adequate insulation.

The device herein described is adapted for use in open wiring, and is so constructed that it may be readily removed to permit the insertion of the conduit, where closed wiring is employed.

In Figs. 1 and 2, the openings 8 through the wall of the panel box are threaded to receive a short threaded tube or nipple 9 which extends beyond the surface of the wall of the box on both sides. Through this sleeve 9 is passed an insulating nipple 10 provided with a flange 11 arranged to rest against one end of the nipple 9. To secure the insulating nipple in place, the nut 12 is employed. This nut is of course threaded to engage the threaded end of the sleeve 9, and has a flange 13 over-lying the end 11 of the insulating bushing or nipple 10.

From the above description it will be seen that the various parts may be readily assembled in the opening 8 or may be removed when it is desirable to enter a conduit tube as illustrated in one instance in Fig. 1.

Fig. 3 illustrates a slightly modified form of insulating bushing or nipple. In this case the nut 14 which engages the threaded sleeve 15 is slightly tapered as at 16, to fit against the tapered surface 17 upon the outer periphery of the insulating bushing or nipple 18. This form provides certain advantages, inasmuch as the insulation projects beyond the nut 14 and precludes the possibility of the wire chafing and short-circuiting through the nut and metal box where a metal nut and metal sleeve are used.

In Fig. 4 there is illustrated a form of sleeve arranged to insure its proper insertion. In this case the threaded sleeve 19 is provided with a shoulder 20, which may be screwed against the surface of the box, while the nut 21 is screwed over the insulating bushing 22, and may be set down against the box. This precludes the possibility of fracturing the insulating nipple 22 when the nut is "set up".

Of course it is understood that all the parts may be made of fiber or material of a nonconducting nature, although there are advantages from making these parts of metal in order to protect the somewhat fragile insulating bushing from breakage.

Obviously the exact form and contour of the parts might be varied to a considerable degree without departing from the spirit or intent of the invention.

What I claim as my invention and desire to secure by Letters Patent is:—

1. An insulator for wall openings having a screw threaded tubular sleeve for insertion in the wall opening, a tubular insulator projecting there-through and provided with a flange at one end, said flange over-lying the end of the tubular sleeve, a perforated cap having a flange over-lying the head of the insulator and inter-engaging screw threads intermediate said perforated cap and the tubular sleeve.

2. An insulator for wall openings consisting of a tubular retainer sleeve arranged to be secured in the wall-opening, a tubular insulating nipple projecting there-through and provided with a tapered head, a perforated cap arranged to engage the retainer and provided with a tapered opening encircling the tapered head of the insulating nipple and adapted to center said nipple with reference to the tubular retainer.

HENRY TRUMBULL.

Witnesses:
H. G. BACHEE,
F. T. WHEELER.